(No Model.)
R. HERWIG.
PROCESS OF PREPARING FISH MEAL.
No. 547,548. Patented Oct. 8, 1895.
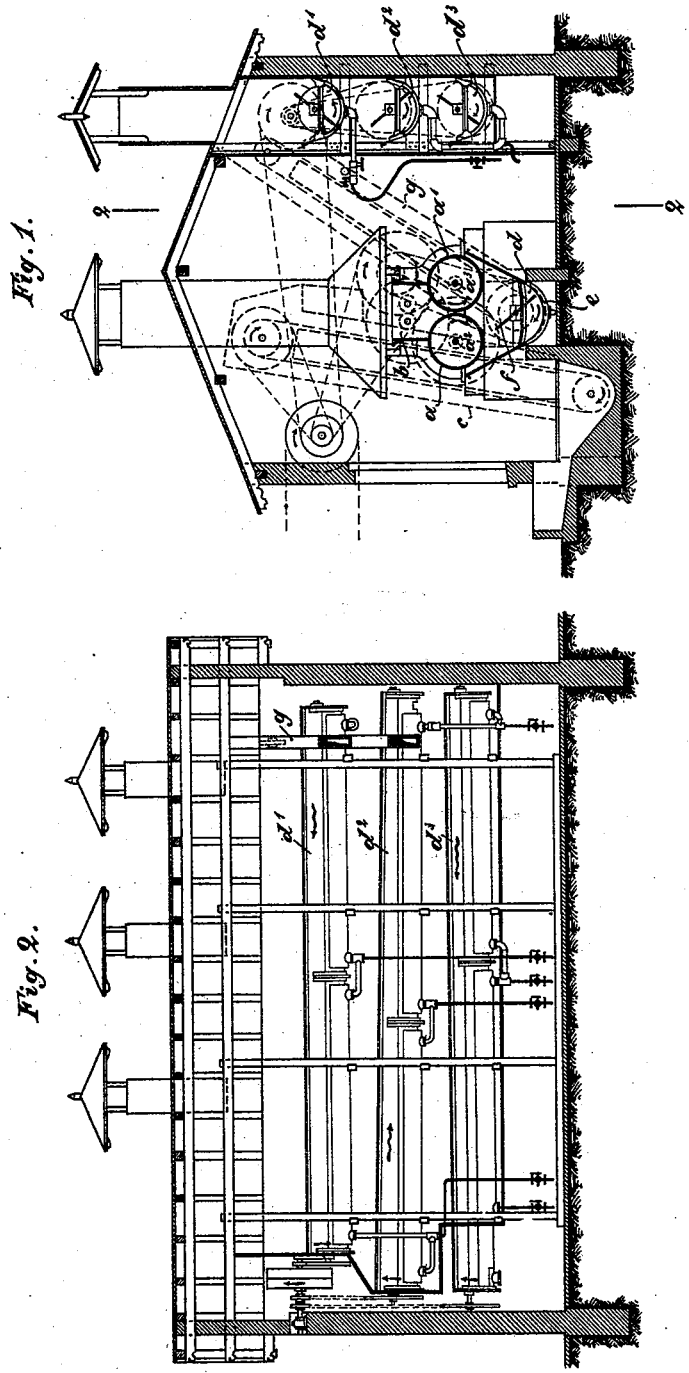
WITNESSES:
INVENTOR
Richard Herwig
BY
Philipp Munson & Phelps
ATTORNEY.

UNITED STATES PATENT OFFICE.

RICHARD HERWIG, OF HAMELN, GERMANY.

PROCESS OF PREPARING FISH-MEAL.

SPECIFICATION forming part of Letters Patent No. 547,548, dated October 8, 1895.

Application filed May 4, 1895. Serial No. 548,097. (No specimens.) Patented in Germany September 17, 1891, No. 62,471; in Sweden May 2, 1892, No. 4,081, and in Norway May 4, 1892, No. 2,734.

*To all whom it may concern:*

Be it known that I, RICHARD HERWIG, a subject of the King of Prussia, and residing at Hameln, in the Kingdom of Prussia, German Empire, have invented a new and useful Improved Process for Preparing Dry Fish-Meal from Fresh Fishy Material, (for which I have obtained patents as follows: in Germany, No. 62,471, bearing date September 17, 1891; in Sweden, No. 4,081, bearing date May 2, 1892, and in Norway, No. 2,734, dated May 4, 1892;) and I do hereby declare that the following is a full, clear, and exact description of the invention, which will enable others skilled in the art to which it appertains to make and use the same.

The present invention relates to the process of transforming fishes and fishy matter into a meal-like or powdery condition to be used in this form as a food for cattle and other animals, and it has for its object to enable such food to be obtained from fresh fishy material, by which term it is desired to indicate in the present specification fresh fish and also refuse or waste of same. The dry powder obtained by the process is free from oily matter, but it contains the whole or nearly the whole of the nitrogenous matter of the material in an assimilable form, and also the phosphates originally present in the same.

The process by which this product is produced substantially consists in a particular mode of operating the elimination of the water from the material by means of dry heat, and in two steps, as follows: First, the raw fresh material, while being subjected to a crushing or disintegrating action, is for a short lapse of time exposed to a high degree of dry heat, so as to cause part of the water confined within the cellules of the tissue to be almost instantaneously vaporized. The thus rapidly-generated vapors burst the walls of the cellules to lay open the juice. The remainder of the water is eliminated by the second step of the drying operation through further evaporation by means of a moderate degree of dry heat. The product thus obtained free from water is then deprived of the oily matter on the well-known extracting process by means of volatile solvents, and is finally ground. In this manner a fish-meal is obtained which is perfectly dry and free from oil, and which contains a high percentage of the nitrogenous matter and the phosphates originally present in the fresh fishy material, while, on the other hand, the oily matter of the same is obtained in the state of pure fish-oil. In both these results the present invention is an important progress over the old process of treating fishy material, which substantially consists in boiling the raw material with water and pressing the residue, whereby, on the one hand, this residue furnishes a meal containing from ten to twelve per cent. of oil and, on the other hand, a very impure oil, the same being contaminated with nitrogenous matter and fine fibers.

In working the process the fishy material is taken in its fresh state—*i. e.*, without any preparing step other than reducing it to pieces, if necessary, or more advantageous— and is passed between a co-operating pair of hollow rotating iron crushing-rollers of large diameter, heated up to about 100° to 120° centigrade by live steam admitted therein. The speed of said rollers is so adjusted that the duration of contact between their hot walls and the material does not exceed from about one to one and one-half minutes. From this crushing action of the rollers and the simultaneous bursting of the cellules by the rapid generation of vapor, due to the high temperature of the roller-surfaces, results a disintegration of the material and the opening of the cellules, so that the greater portion of the water contained therein is rapidly eliminated by evaporation without any sensible alteration of the nitrogenous and oily matters taking place on account of the very short time that the material is in contact with the heated rollers. The material, thus partially deprived of water, drops from between the said rollers and is received in and caused to pass through trough-shaped open vessels provided with a steam-jacketed bottom, by means of which they are heated to about 50° to 60° centigrade, and with stirrers, so that the material while passing through the troughs at said moderate temperature is constantly turned over to bring fresh particles to the surface and to the hot walls of the troughs. In consequence of the large expulsion of water from the opened cellules in the first heating operation, this second evaporation, by means of a moderate heat by which the remainder of the water is expelled, takes only from about three to three and one-half hours. The temperature in this second step of the evaporation process is so low that it does not alter the oily and nitrogenous contents of the material. The material thus liberated from water is now deprived of the oily matter by extracting the latter by aid of benzine or other known volatile dissolvents and in any convenient type of extracting apparatus, and, finally, the unoiled residue which has become perfectly dry is ground.

On the annexed sheet of drawings an apparatus is shown adapted for carrying out the heating process in two operations, as heretofore described.

Figure 1 is a vertical cross-section through the plant, and Fig. 2 a section on line 2 2, Fig. 1, looking to the right.

$a$ and $a'$ are the two hollow crushing and heating rollers or drums, which are supplied with live steam through their hollow axles, respectively $a^2$ and $a^3$, and $b$ is a hopper for feeding said rollers with the fishy material delivered into said hopper through an elevator $c$. The rollers are caused to rotate in the direction of the arrows and preferably with such a speed as to make one revolution a minute. The hot and crushed material dropping from between the said rollers is received in a long trough-shaped open vessel $d$, provided with double bottom $e$, having inlets for steam and outlets for the water of condensation, and with a stirrer $f$, by the action of which the material is passed to the delivery end of the trough. At this end is arranged an elevator $g$, which takes up the material and delivers the same in the upper trough of a series of long open troughs $d'$ $d^2$ $d^3$, placed one above the other in a vertical plane and of the same construction as the trough $d$, so that the material is constantly heated and turned over and delivered from the upper trough into the next one following until it arrives at the bottom, where it is removed to be treated in the extracting apparatus. The troughs of this series are somewhat inclined toward each other, so as to form a zigzag passage, through which the material travels from the top to the bottom, as indicated by arrows in Fig. 2.

This apparatus does not constitute any part of the present invention, but only serves as an example to show how the process may be carried out with advantage.

It is obvious that the process described is not dependent upon this apparatus, as there are many combinations within the reach of the skilled mechanical engineer by the aid of which the heating process in two steps can also be carried out in convenient manner.

What I claim is—

The process of preparing dry fish meal from fresh fishy material consisting in first subjecting the material for a short time to the action of a high dry heat in the manner and for the purpose described, then driving out the remainder of water by a moderate dry heat, removing the oil from the material by means of oil solvents, and finally grinding the unoiled residue, substantially as and for the purpose described.

In testimony whereof I have hereunto set my hand in the presence of two subscribing witnesses.

RICHARD HERWIG.

Witnesses:
CAESAR BASCH,
GEORGE C. CHRISTOPHER.